United States Patent [19]

Hon et al.

[11] Patent Number: 5,269,550
[45] Date of Patent: Dec. 14, 1993

[54] MOUNTAIN BIKE

[75] Inventors: David T. Hon, Los Angeles, Calif.; Chuan Liao; Guo M. Cheng, both of Taipei, Taiwan

[73] Assignee: Dahon California, Inc., Culver City, Calif.

[21] Appl. No.: 649,609

[22] Filed: Feb. 1, 1991

[51] Int. Cl.⁵ .............................. B62K 15/00
[52] U.S. Cl. ...................... 280/278; 280/279; 280/287; 74/551; 403/92
[58] Field of Search ........... 280/287, 278, 274, 281.1, 280/288.4, 279; 403/92, 97, 102; 74/551.4, 551.6, 551.3

[56] References Cited

U.S. PATENT DOCUMENTS

| | | | |
|---|---|---|---|
| 561,329 | 6/1896 | Leonard | 74/551.6 |
| 578,011 | 3/1897 | Girardet | 280/287 |
| 585,858 | 7/1897 | Wooster | 403/97 |
| 617,536 | 1/1899 | Martin | 280/287 |
| 1,232,871 | 7/1917 | Watters | 403/97 |
| 2,359,764 | 10/1944 | Johnson | 280/287 |
| 3,883,157 | 5/1975 | Simpkins | 403/92 |
| 3,950,758 | 4/1976 | Mirrione et al. | 403/92 |
| 4,433,852 | 2/1984 | Hon | 280/287 |

FOREIGN PATENT DOCUMENTS

| | | | |
|---|---|---|---|
| 0466901 | 5/1914 | France | 280/287 |
| 0008507 | 6/1886 | United Kingdom | 74/551.3 |

Primary Examiner—Charles A. Marmor
Assistant Examiner—A. M. Boehler
Attorney, Agent, or Firm—Thomas M. Small

[57] ABSTRACT

A bicycle of the "mountain bike" type having two aligned foldable joints in the frame, a folding handlebar assembly and a foldable pedal. Each of the frame joints is mounted in a gap in a tubular frame member and includes two disks disposed flushly against the ends of the tubular members with smaller plugs fast in the members, and two hinge leaves extending across the gap longitudinally of the frame. A rivet on one side of the joint joins two ears on the leaves to form the hinge axis, and a headed fastener with a hexagonal socket is recessed into the thickened central portion of the upper leaf and threaded into the lower leaf to clamp the leaves together. Interlocking ribs between two ears on the other side of the joint prevent relative pivoting movement when the leaves are clamped together. The handlebar assembly has upper and lower tubular adjustment sections for both upward and forward adjustment of the handlebar, and an angled hinge between these sections. A cup-shaped coupler forms the base of the upper section and is clamped tightly against the lower section by a headed fastener, the fastener having a substantially recessed head with a hexagonal socket. The adjustment sections also have clamps with similar connectors. A representative hexagonal tool is included.

42 Claims, 6 Drawing Sheets

MOUNTAIN BIKE

BACKGROUND OF THE INVENTION

This invention relates to foldable bicycles, and in particular to a folding bicycle having a foldable frame and a foldable handlebar assembly for reducing the bicycle to a relatively small, compact package for convenience in transporting and storing the bicycle when it is not in use. The invention is particularly suitable for, but not limited to, safety bikes, or so-called "mountain bikes", that have relatively large wheels and tires and relatively sturdy, generally triangular frames, for use not only on paved roadways but also on rougher surfaces such as trails.

Folding bicycles have been known and used for many years, in various configurations and sizes and with a variety of different approaches to the folding of the bicycle. One very popular folding bicycle is that shown and described in U.S. Pat. No. 4,433,852, designed to use relatively small wheels (e.g., sixteen inches in diameter) on a low-profile frame carrying handlebar and seat assemblies that fold and extend upwardly to dispose the handlebar and the seat at the desired height for any user, ranging from a child to a full-size adult. The reduced size of the wheels and low-profile frame of this patented bicycle permit the folding of the bicycle into a very compact package. The handlebar assembly includes an elongated post that is hinged at its lower end on an inclined axis to turn the handlebar into a front-to-rear attitude as it is folded down, and the frame is hinged at its longitudinal midpoint to fold the front and rear wheels into side-by-side relation.

Larger bicycles also have been designed for folding, but folding full-size bicycles have not met with great popularity, perhaps because of the complexity and bulk of the folding features and in part because of the unsightliness or obtrusiveness of those features. Instead, it remains popular among serious cyclists to "break down" the bicycle to some extent by removing at least the front wheel, and to transport or store the bicycle in such a broken-down condition. It will be apparent that mere removal of the front wheel will not be sufficient to reduce a full-size bicycle to an easily stored or transported package.

The objective of the present invention is to provide improved foldable features that can be applied to bicycles of all kinds and that are particularly well-suited for use in mountain bikes that have substantially straight handlebars.

SUMMARY OF THE INVENTION

The present invention resides in an improved foldable bicycle with a foldable frame and a foldable handlebar that not only are quickly, easily and securely operable to effect the folding and unfolding of a bicycle, including a full-size mountain bike, into and out of a relatively compact folded condition, but which also has the appearance, when unfolded, of a conventional bicycle without the interference or disturbance, either visually or functionally, of the folding components. In other words, the invention provides a foldable bicycle that looks, feels and performs like a non-folding bicycle, but with the advantages of foldability in transporting and storing the bicycle.

For these purposes, the bicycle of the present invention has a foldable frame with at least one longitudinal frame member, and usually two, joined together by a rugged folding joint that is disposed in a gap in the frame member in substantially flush relation, and a foldable handlebar assembly which is held securely in the normal operating position in an inconspicuous manner and is easily releasable to swing into an out-of-the-way front-to-rear position alongside the frame about a relatively inconspicuous hinge that is positioned along one side of the handlebar post. Both the frame hinge and the handlebar hinge have fasteners that are recessed, when engaged, into unobtrusive positions, and that may be released quickly and easily with one convenient tool, which may be usable to make adjustments in the handlebar position and the seat, as well.

More specifically, as shown in the preferred embodiment illustrated herein, each of the novel folding joints comprises two substantially flush hinge mounts disposed in the gap in the frame member, preferably with plugs fitted tightly into hollow ends of the frame member and bodies that abut against the ends, and two side-by-side hinge leaves that are secured to the hinge mounts and extending across the gap from opposite sides thereof, longitudinally of the bicycle. The leaves are pivotally connected together by a hinge pin for swinging relative to each other as the two end portions of the frame member fold into side-by-side relation about a hinge axis that is midway between the front and rear wheel mounts, the axis being vertical when the bicycle is in its normal upright operating position, and the hinge leaves being horizontal. To secure the frame in the unfolded condition, clamping means, herein a headed fastener extending through one hinge leaf and threaded into the other, clamps opposed locking surfaces of the leaves together, and interlocking, opposed abutments are formed on these surfaces to prevent relative movement when the surfaces are clamped together. The hinge pin permits relative separating movement of the leaves axially of the hinge, to disengage these abutments for folding.

The preferred hinge leaves are thickened lugs having generally semi-cylindrical central portions flush with the frame member, which typically is a tube of circular cross-sectional shape, and with laterally projecting ears that lie along the sides of the frame member. The head of the clamping fastener is recessed into one of the central portions and the fastener is threaded into a socket in the other, while the pivot pin is set in the two ears on one side and the interlocking ribs are formed on the adjacent surfaces of the other two ears on the other side. The fastener preferably is held captive by a lost-motion connection on the lug with the head recess, to prevent accidental loss when released, and the preferred head configuration is of the socket type, engageable by a non-circular driving tool such as a hexagonal wrench.

In a bicycle having a frame with both top and bottom longitudinal frame members, called a "top tube" and a "down tube", two similar folding joints are provided in gaps that are aligned along a common hinge axis. Since the typical down tube is inclined downwardly and rearwardly from the fork stem at the front of the frame, the hinge leaves of the lower folding joint are disposed at an angle with the two end portions of the down tube.

The novel folding handlebar assembly has an inclined hinge on one side for folding into a front-to-rear attitude in the same general manner as in the bicycle of the aforementioned patent, but without the elongated post or the cup-like base of the post in that bicycle, and has a fastening device that is inconspicuously recessed into a component of the stem of the handlebar, for operation in the same manner as the fasteners securing the frame hinges. In the illustrative embodiment, the fastening device includes a coupling between upper and lower sections of the handlebar assembly, and a headed fastener that extends downwardly into the upper end of the lower section of the handlebar assembly. The fastener head preferably is recessed into the upper end of the coupler body with a non-circular socket for receiving the same driving tool that operates the fasteners of the frame folding joints. This tool also can be used for other bicycle mechanisms, such as the upward seat extension.

The inclined hinge is connected between the coupler body and the lower section, to permit folding of the handlebar when the fastener is disengaged from the socket, the fastener having a lost-motion connection holding it captive on the coupler body when disengaged from the socket. In addition, the handlebar assembly has a forwardly adjustable extension mechanism between the coupler and the handlebar, as well as an upwardly adjustable extension mechanism below the coupler permitting customizing of the handlebar's operating position more effectively than has been possible with prior handlebar assemblies.

These features combine to produce a highly versatile folding bicycle with virtually the same look, feel and performance as a non-folding bicycle, and provide for quick, easy and secure operation of the folding mechanisms. These and other features of the invention will be more readily understood from the following detailed description, taken in conjunction with the accompanying drawings.

DETAILED DESCRIPTION OF THE PREFERRED EMBODIMENT

General Structure

Figure 1:
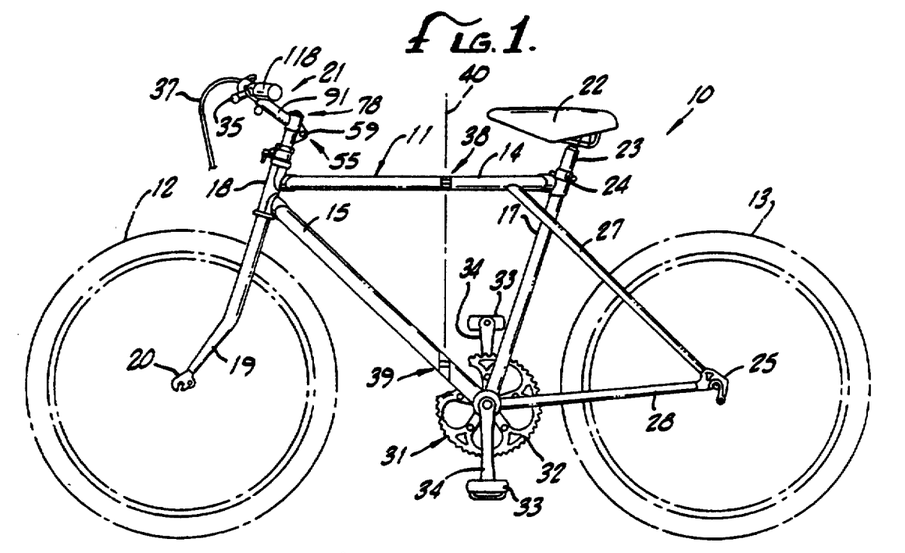
FIG. 1 is a side elevational view of the basic parts of an illustrative foldable bicycle embodying the novel features of the present invention, with parts broken away for clarity and the wheels shown only in broken lines.
Figure 2:
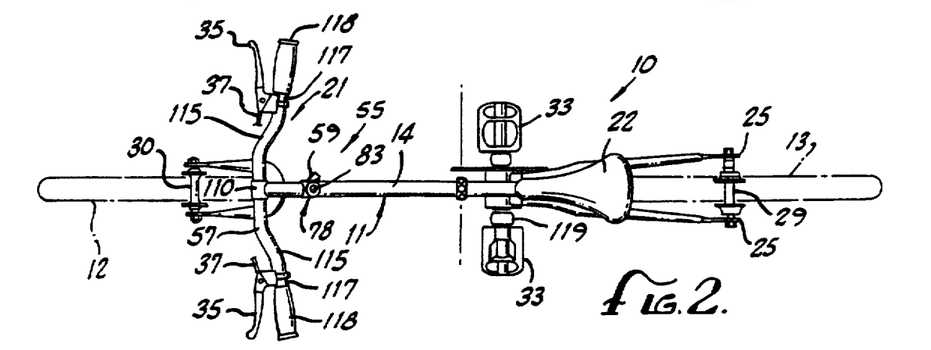
FIG. 2 is a top plan view of the foldable bicycle.

As shown in the drawings for purposes of illustration, the present invention is incorporated in a bicycle, shown most clearly in FIGS. 1 and 2 and indicated by the general reference number 10, which is of the so-called "mountain bike" type having a relatively heavy frame 11 and front and rear wheels 12 and 13 that are heavier than the wheels of racing bicycles and the popular "10 speeds" that have been in use for many years. It is to be understood, however, that while the present invention is particularly well suited for this type of bicycle, it is not limited thereto.

The illustrative bicycle 10 has a generally triangular frame 11 of basically conventional shape and design, including a horizontal frame member 14, usually called a "top tube", a downwardly and rearwardly inclined frame member 15, called a "bottom tube", a generally upright seat post 17 connecting the rear ends of these frame members, and a front wheel support 18 connecting their front ends, typically called a "head tube". This tube carries the front wheel, typically on a fork 19 that is inclined downwardly and forwardly from the head tube with a wheel mount 20 at its lower end and a handlebar assembly 21 connected to its upper end, above the head tube. A seat 22 is mounted on an extension post 23 that telescopes into the seat post 17 and is held by a clamp 24.

A triangular rear frame structure is provided to support the rear wheel 13 on a wheel mount 25, the rear structure comprising a pair of upper struts 27, sometimes called "seat stays", that are inclined downwardly and rearwardly from the top tube 14 near the seat post 17 to the rear wheel mount, and a pair of generally horizontal lower struts 28, sometimes called "chain stays", that extend rearwardly to the rear wheel mount from the lower end of the seat post. The rear wheel mount comprises two mounting elements for engaging opposite ends of a rear axle 29, shown in FIGS. 2 and 3, and the front wheel mount comprises two similar elements for holding a front axle 30.

Figure 3:
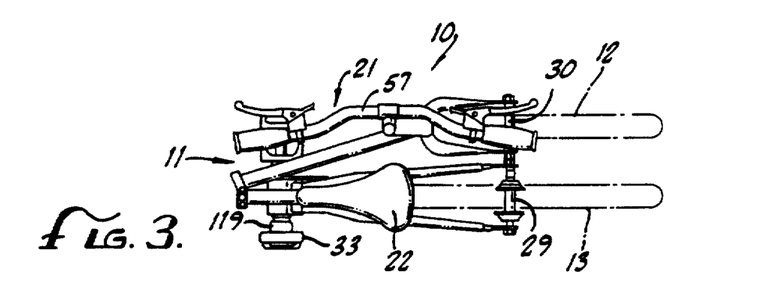
FIG. 3 is a top plan view of the bicycle, in the folded condition.

Completing the basic components of the bicycle 10 is a pedal-and-sprocket assembly 31 that is rotatably mounted on the frame at the lower ends of the seat post 27 and the down tube 15, including a sprocket or "chain wheel" 32 on the right-hand side of the frame, the upper side in FIG. 2, and two pedals 33 mounted on cranks 34 that extend generally radially outwardly from the sprocket to drive the bicycle in a conventional manner through a chain (not shown) and a rear sprocket assembly (not shown) driven by the chain. The pedal 33 on the side of the frame opposite the chain wheel preferably is foldable upwardly, as shown in FIG. 3. These elements, and the usual gear-shifting mechanism (not shown) typically will be included with the bicycle but form no part of the present invention. Similar, brakes will be included for operation by manual actuators 35 on the handlebar 21, through cables 37, but these also may be of conventional construction that does not require illustration herein.

The Frame Hinge

In accordance with the present invention, the frame 11 is provided with two inconspicuous folding joints 38 and 39 that are interposed in gaps in the top tube 14 and the down tube 15 and lie on a common hinge axis 40 in substantially flush relation with the two tubes. Two hinge mounts 41 (see FIG. 7) of each joint are secured to the adjacent ends of the associated frame member and two hinge leaves 42, 43 of each joint lie in side-by-side relation in the joint and are connected for relative swinging movement about the hinge axis. A non-protrusive fastener 44 is provided for selectively clamping the leaves securely together and releasing them for folding of the bicycle, and interlocking means are provided on the adjacent sides of the hinge leaves for positively preventing relative movement of the leaves when clamped together.

More specifically, as can be seen most clearly in FIGS. 7 through 10, each of the hinge mounts 41 of the upper folding joint 38 comprises a circular disk that is joined coaxially to a small cylindrical plug that fits snugly into the open end of the top tube and is suitably secured therein, as by brazing, the disks having the same outside diameter as the top tube. Each hinge leaf 42, 43 extends longitudinally of the frame away from one of the disks 41 and lies on one side of a parting plane for the hinge, herein generally along the longitudinal axis of the top tube and generally horizontal when the bicycle is in the normal operating position.

Figure 7:
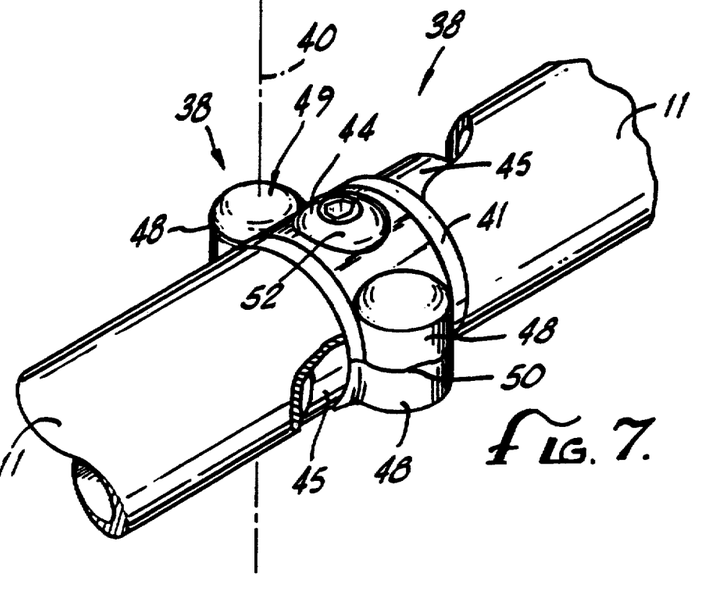
FIG. 7 is an enlarged fragmentary perspective view of the folding joint in the top tube, with parts broken away for clarity, the joint being in the closed operating condition.
Figure 8:
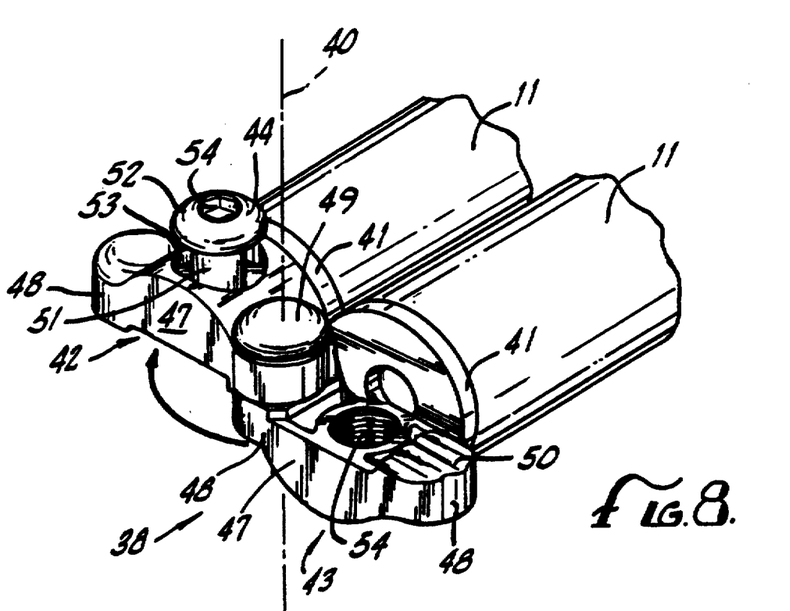
FIG. 8 is an enlarged fragmentary perspective view of the folding joint in the top tube, with parts broken away for clarity, the joint being in the open folded condition.
Figures 9, 10:
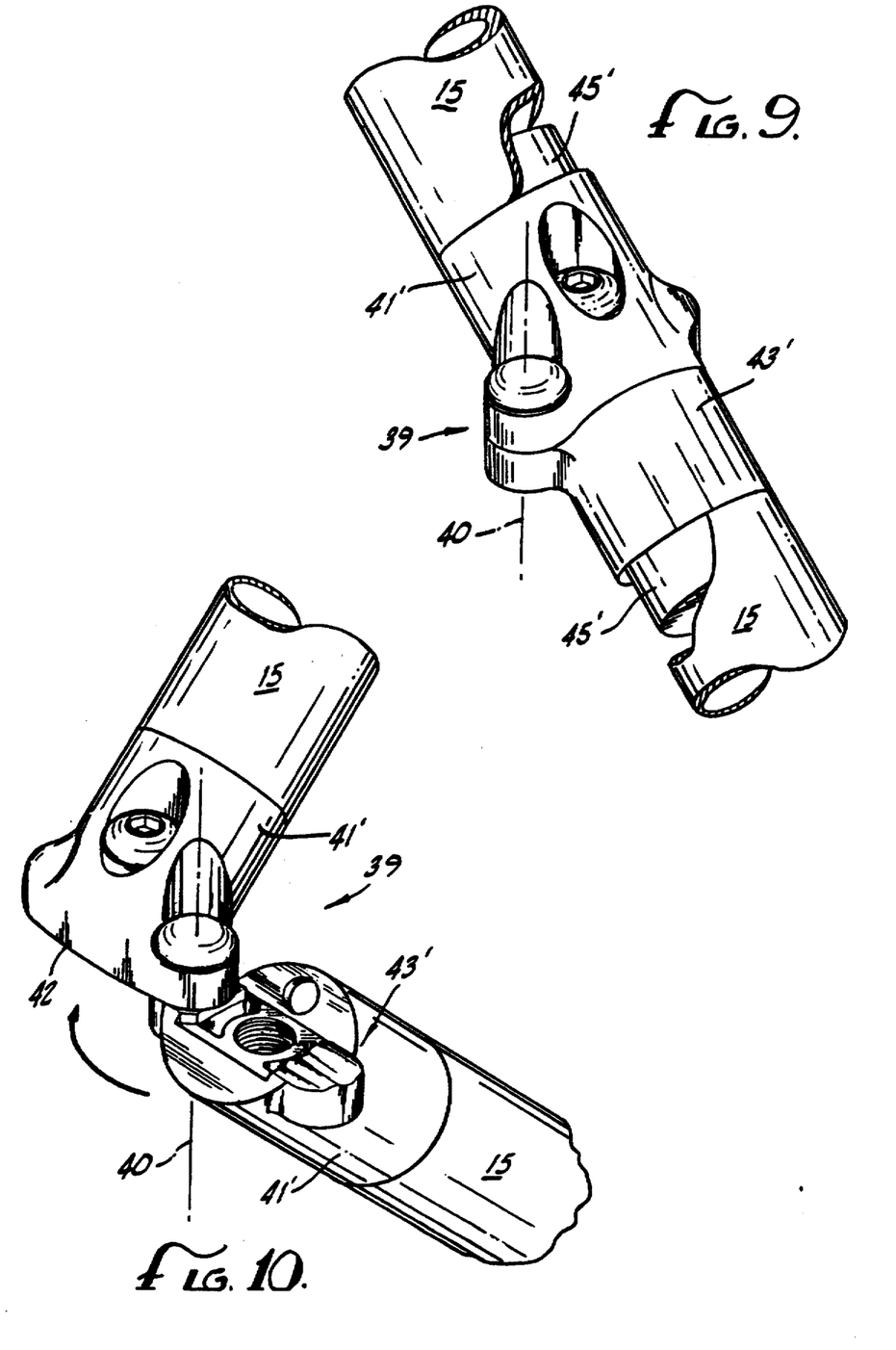
FIG. 9 is an enlarged fragmentary perspective view of the folding joint in the down tube, with parts broken away for clarity, the joint being in the closed operating condition.
FIG. 10 is an enlarged fragmentary perspective view of the folding joint in the down tube, with parts broken away for clarity, the joint being shown in a partly opened position.

As shown in FIGS. 7 and 8, each hinge leaf 42, 43 is in the form of a thickened lug that preferably is formed integrally with the mounting disk 41 and has a generally semi-cylindrical central portion 47 and two ears 48 on opposite lateral sides of the central portion. These ears project outwardly slightly beyond the lateral sides of the top tube and preferably have rounded outer ends. The hinge axis 40 is defined by a pivot pin 49 which is a rivet having heads on opposite sides of the two ears on one side, the left-hand side as viewed in FIGS. 7 and 8. The rivet is loose enough to permit a slight amount of vertical "play" in the joint when the fastener 44 is released for folding. This play permits the engagement and disengagement of the interlocking means, which are interfitting ribs and grooves 50 in the adjacent faces of the two ears 48 on the opposite side of the joint from the rivet 49. These ribs and grooves are complimentarily shaped to nest together when the joint is closed as shown in FIG. 7, thereby to resist opening movement of the hinge. As can be seen in FIGS. 8 and 10, the central portion of the clamping face of each of the hinge leaves 42, 43 is recessed, to avoid interference with clamping of the end portions together.

To clamp the interlocking ribbed and grooved faces 50 securely together, the fastener 44 is a bolt having a stem 51 which extends through a vertical passage generally centered in the top lug 42, with a head 52 disposed in a recess 53 on top of this lug formed by the enlarged upper end of the passage, and is threaded into an aligned, internally threaded passage 54 (FIG. 8) generally centered in the lower lug 43. The fastener bolt has a socket 54 in its head 52 for receiving a hexagonal driving tool, and preferably is held captive by a lost-motion connection between the bolt stem and the lug, permitting limited up-and-down motion between the locked and released positions shown in FIGS. 7 and 8 but preventing complete separation of the bolt from the lug. Interlocking annular reinforcing ridges and grooves (not shown) may be formed in the ears around the rivet to block lateral shifting of the lugs in the closed joint.

The lower folding joint 39 (see FIGS. 9 and 10) is generally similar to the upper joint 38 but differs in the orientation of the lower hinge leaves relative to the longitudinal axis of the down tube, these leaves and other generally similar parts of the lower folding joint being indicated by corresponding primed reference numbers. Since the down tube 15 is disposed at an angle with the top tube 11 and the hinge axis 40, the hinge leaves 41' and 43' have opposing surfaces that are disposed at angles with the longitudinal axis of the down tube to lie in a parting plane that is parallel to the parting plane of the upper folding joint. Both of these planes are substantially horizontal when the bicycle is in the normal operating position.

For this purpose, the lower hinge leaves 41' and 43' have opposed faces substantially in a horizontal plane that intersects the down tube at an angle of approximately forty-five degrees. The leaves are in the form of lugs of tapering thickness extending longitudinally of the bicycle 10 from two mounting disks 41' that are secured to the two sections of the down tube by plugs 45' of reduced diameter that are fast in the tube sections. The two lower mounting disks are shown as somewhat thicker than the upper mounting disks, but the lower folding hinge is in all other respects the same as the upper folding hinge. Accordingly, corresponding parts are indicated with the same reference numbers.

The Handlebar Assembly

Another important aspect of the present invention is the foldable handlebar assembly 21 which uses an inclined hinge 55 (see FIG. 2 ) to dispose the handlebar assembly in a convenient out-of-the-way position when folded, and includes an inconspicuous and very effective fastening device for both securing the handlebar assembly in place and releasing it quickly and easily for folding. In addition, the handlebar assembly provides a greater degree of adjustability of the handlebar positions than has been available in other bicycles, providing both vertical and forward adjustments.

Figure 4A:
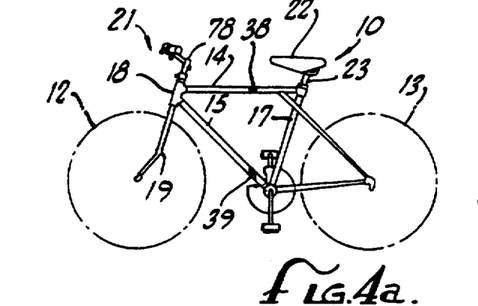
FIGS. 4a through 4e are diagrammatic views on a reduced scale showing the steps of folding the bicycle from the condition in FIG. 2 to the condition in FIG. 3.
Figure 4B:
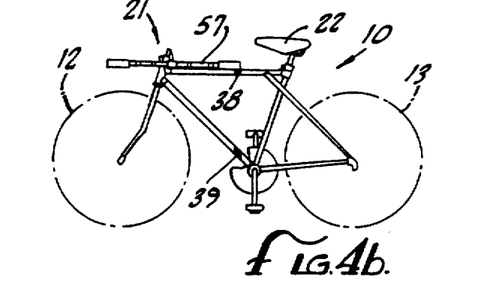
Figure 4C:
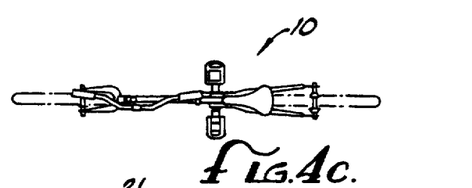
Figure 11:
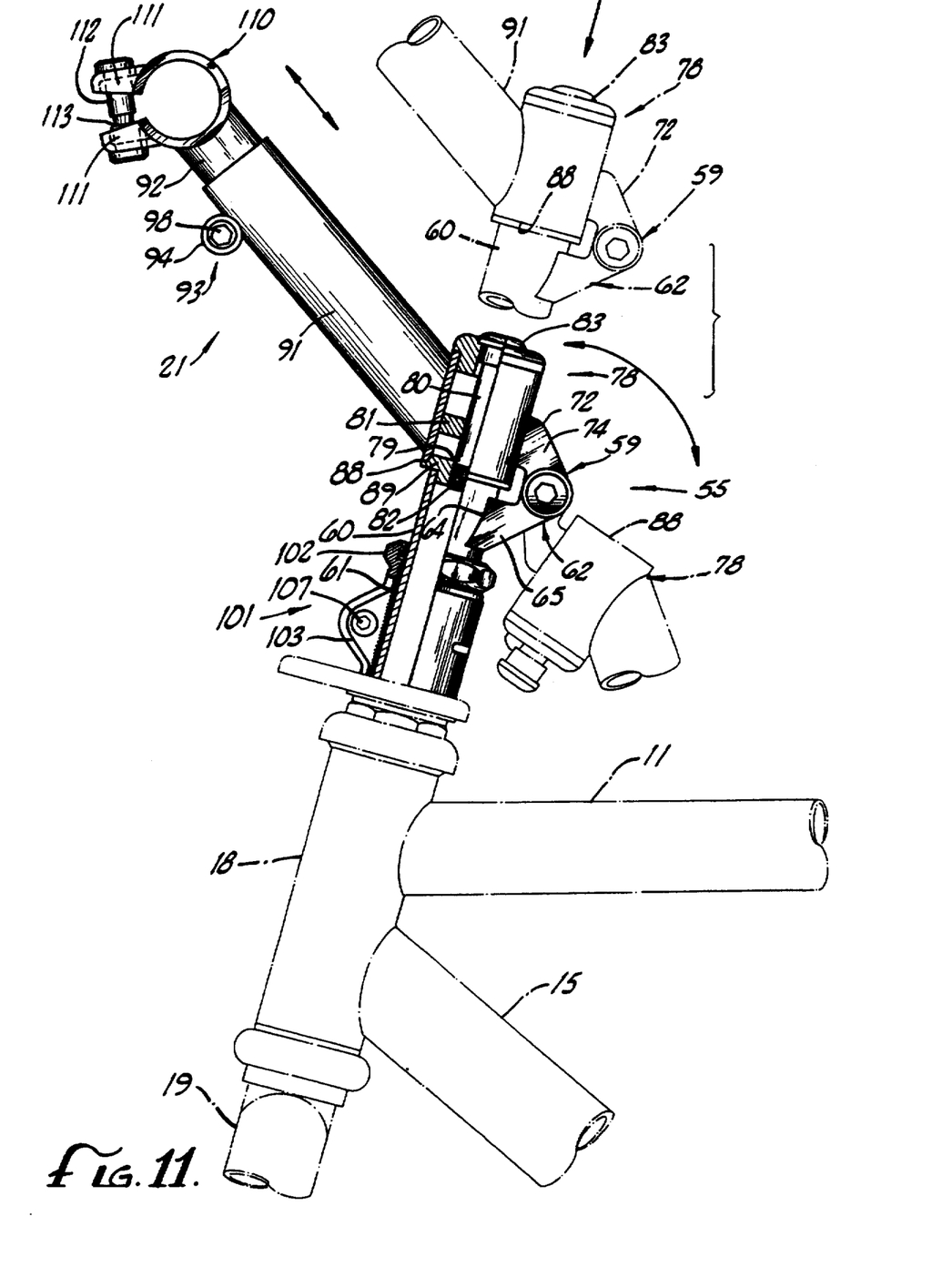
FIG. 11 is a fragmentary side elevational view of the handlebar assembly of the foldable bicycle of FIGS. 1 and 2, shown on an enlarged scale with parts in section for clarity of illustration and with moved positions and related portions of the frame shown in lighter, broken lines.

As shown diagrammatically in FIGS. 1, 4b and 4c and in full lines in FIG. 11, the handlebar assembly 21 comprises, in addition to the handlebar 57 itself, an upper, handlebar-supporting section that is inclined downwardly and rearwardly from the handlebar and a lower handlebar stem section that is joined to the upper end of the fork 19 at the stem tube 18. The handlebar hinge 55 is disposed along one side of the handlebar stem at an angle that is both vertically inclined and laterally inclined, as seen in FIG. 2, to rotate the folded handlebar assembly into the front-to-rear attitude shown in FIGS. 4b, 4c and 4d as an incident to the downward swinging of the handlebar. The details of such swinging are explained in more detail in the aforesaid patent.

The general construction of the handlebar assembly is best illustrated in FIG. 11, wherein it can be seen that the assembly is supported on a handlebar stem 60 that extends upwardly from an externally threaded tube 61 projecting upwardly from the front wheel fork 19 through the stem tube 18. As shown in both FIG. 11 and FIG. 12, the hinge pin 59 is carried by a lower, generally U-shaped hinge member 62 that has a base 63 (FIG. 12) with two arcuate surfaces 64 that abut against and are secured as by welding to the handlebar stem 60, on the generally rearward-facing side thereof. Two generally upwardly extending but tilted arms 65 on the base are formed with holes 67 for receiving the pivot pin 59. This pin is formed in two parts, one 68 (on the left in FIG. 12) a headed stud with a threaded hole 69 in its end and the other (on the right) a headed shoulder bolt 70 having a threaded end 71 for engagement in the threaded hole 69. These two parts are inserted into the holes 67 from opposite sides through an upper hinge member 72, and are threaded together with a tight fit.

Figure 12:
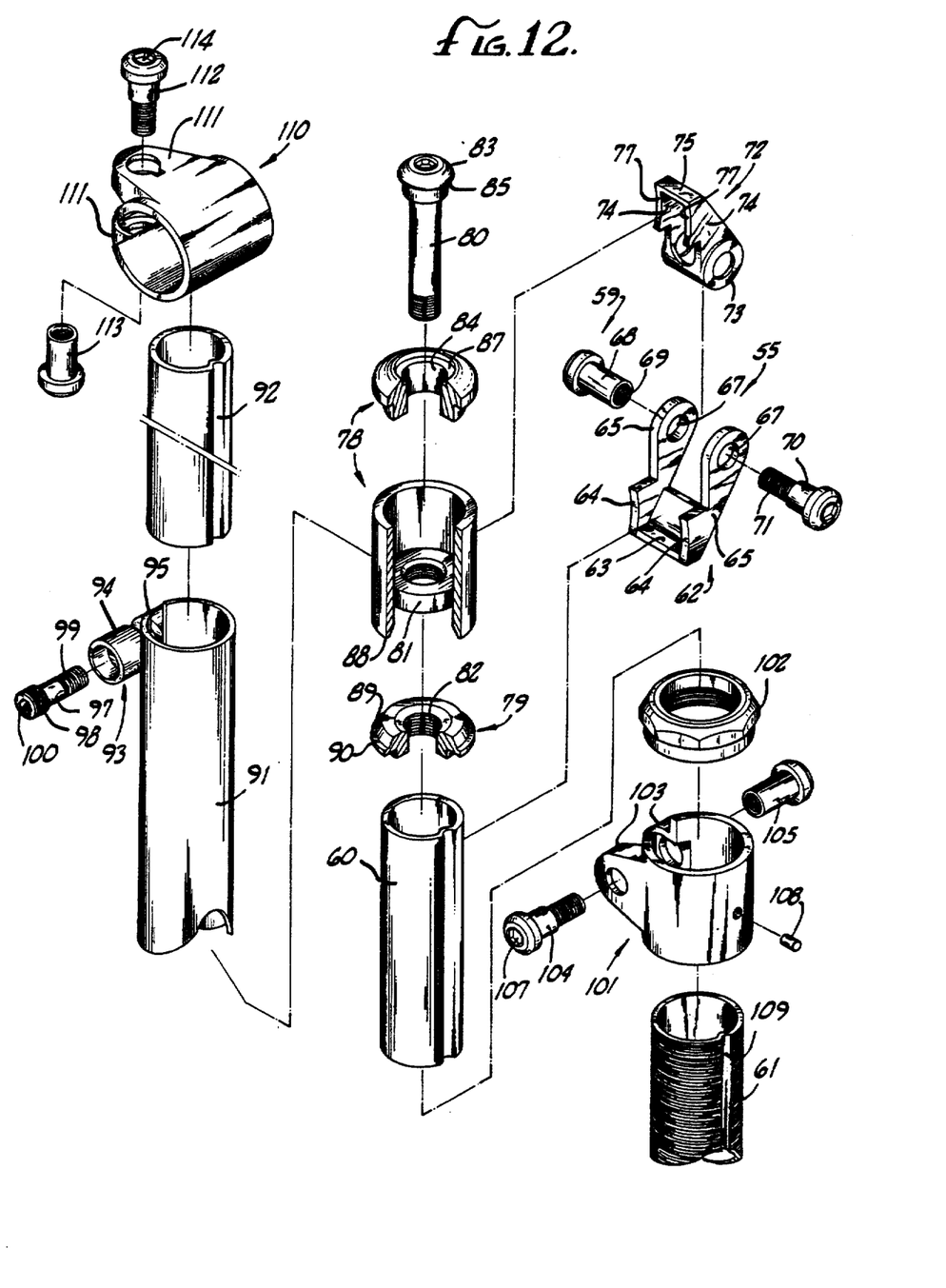
FIG. 12 is an exploded perspective view of parts of the handlebar assembly, from the upper end portion of the fork stem, shown fragmentarily at the lower right-hand corner of the figure, to the handlebar holder at the upper left-hand corner of the figure, some parts being partially broken away and shown in cross-section.

The upper hinge member 72, also shown in detail in FIG. 12, has a barrel-shaped lower end 73 through which the pivot pin 59 extends, and two generally parallel arms 74 that are connected at their ends by a web 75 and have curved sides 77 for connection to the handlebar assembly above the hinge. Both hinge members preferably are made as relatively heavy metal parts that are sufficiently rugged to sustain the forces encountered in folding and in supporting the folded, depending handlebar in the folded position shown in FIG. 4b. As will be seen, however, the hinge is not required to sustain any significant forces during normal operation, because these forces are not transmitted through the hinge.

Instead, the handlebar assembly 21 includes a novel locking mechanism between the upper and lower handlebar sections that is both relatively inconspicious and very effective in securing the handlebar in place. For this purpose, a cup-like coupler 78 is joined to the upper handlebar section and normally seats against and rests on the upper end of the handlebar stem 60, as an upward extension of that stem. An end plug 79 (FIGS. 11 and 12) is secured in place in the upper end of the stem, and a fastener 80 extends downwardly through the coupler and a guide disk 81 therein and has an enlarged lower end that is threaded into a socket 82 in the end plug 79. The fastener herein is a bolt having a head 83 that is partially recessed into the upper end of the coupler, this end being a relatively heavy plug that has a center hole 84 into which the bolt head fits. A flange 85 around the upper end of the head abuts against the bottom 87 of shallow recess in the end plug around the center hole so that the head is substantially recessed into the coupler when tightened into the socket 82. The guide disk 81 has a threaded hole the same size as the socket, so that the slightly smaller stem of the fastener 80 slides freely in this hole. The guide thus functions as a stop, forming a lost-motion connection between the fastener and the coupler 78.

At the lower end of the cup-shaped coupler 78, its annular lower edge portion 88 fits snugly around the raised central portion 89 of the plug 79 and tightly against a lower rim 90 (FIG. 12) of the plug. The surfaces 88 and 89 are shaped for snug, interfitting engagement when clamped together by the handlebar fastener, and herein are shown as being complimentarily tapered for a very tight fit.

The upper section of the handlebar assembly 21 is a first extension joint comprising a pair of telescoping supports, herein two tubes 91 and 92 that provides both upward and forward adjustability of the handlebar. The larger, lower tube 91 is joined to the front side of the coupler 78 and extends upwardly and forwardly at an angle with the horizontal that preferably is between twenty-five and forty degrees, and the smaller upper tube 92 projects upwardly beyond the upper end of the lower tube a variable distance. A clamp 93 is provided adjacent the upper end of the larger tube, which may be split as shown in FIG. 12 to permit contraction of the outer tube about the inner tube for secure clamping. The clamp is formed by two cup-shaped clamp elements 94 and 95 secured to the tube 91 on opposite sides of the split, and a headed connector 97 with its head 98 received in one cup and its threaded end 99 threaded into the other cup to draw the two cups together. This connector also has a non-circular socket 100 for operation by the same tool used for the other clamping mechanisms.

A second extension joint is provided between the upward extension 61 of the front wheel fork 19 and the handlebar stem 60, for upward adjustment of the handlebar assembly 21. This joint is formed by telescoping the handlebar stem 60 into the externally threaded upward extension 61 above the head tube 18, and includes another generally C-shaped clamp 101 disposed beneath a locknut 102 threaded onto the extension. As shown in FIG. 12, the clamp encircles the upper end of the extension and has two spaced ends 103 in front of the extension to be drawn together in order to secure the joint in a selected adjusted position. In this clamp, a two-piece clamping bolt 104, 105 similar to the pivot pin 59 clamps the two free ends tightly together. The bolt also has a non-circular socket 107 in its head. A pin 108 (FIG. 12) projects from the clamp 101 into a groove 109 in the threaded extension to prevent relative rotation of the parts.

To mount the handlebar 57 on the handlebar assembly 21, another generally C-shaped clamp 110 is secured to the upper end of the telescoping tube 92 with two free ends 111 of the clamp extending forwardly in vertically spaced relation as shown in FIG. 11. The center of the handlebar is disposed in this clamp, and another two-piece connector 112, 113, similar to the connector 104, 105, and the hinge pin 59, is operable to tighten the clamp around the handlebar. This connector also has a non-circular socket 114 for receiving the same driving tool.

As best shown in FIGS. and 2, the preferred handlebar configuration for the bicycle 10 of the present invention is of the type that has two laterally projecting, substantially straight central portions on opposite sides of the central clamp 110, rearwardly and outwardly inclined intermediate portions 115, and free end portions 117 that bend back outwardly to a lesser degree of rearward inclination. As can be seen in FIG. 1, the free end portions 117 carrying the grips 118 also are angled slightly downwardly. These bends not only position the grips conveniently for the rider but also cause the folded handlebar to "nest" compactly around the head tube 18 as shown in FIGS. 3 and 4c.

Figure 4D:
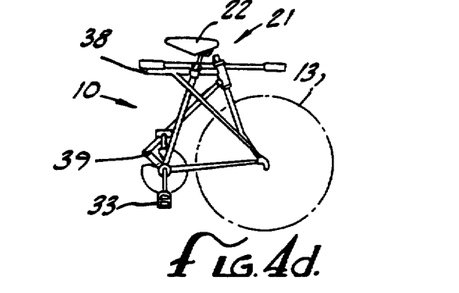
Figure 4E:
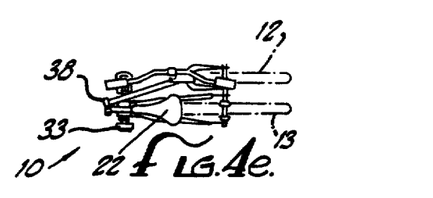

In all other respects, the foldable bicycle 10 may be of basically conventional construction. The hand brake operators 35 are mounted on the handlebar 57 in a conventional manner, and a conventional gear-shifting mechanism (not shown) may be provided. The pedal/-sprocket assembly may include different sizes of driving chain wheels, only one 32 being shown herein, and preferably will include at least one pedal 33 that is foldable. Herein, the left-hand pedal (facing forwardly) which remains outside the folded frame is foldable upwardly about its mounting 119 at the lower end of the crank on the left side, as shown in FIG. 3, 4d and 4e. A conventional pedal hinge may be used for this.

Figure 5A:
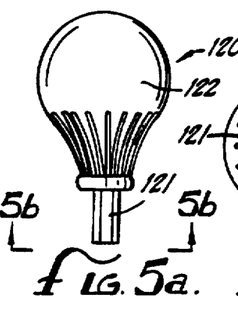
FIGS. 5a and 5b are side elevational and bottom plan views, respectively, of an illustrative tool for operating the folding mechanisms of the foldable bicycle, shown on an enlarged scale.
Figure 5B:
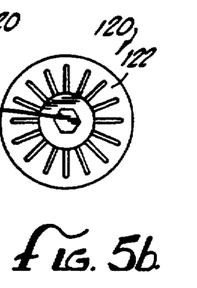

Shown in FIG. 5a and 5b is a representative tool 120 for use with the various connections for the folding mechanisms. It comprises a hexagonal stem 121 and a conveniently gripped handle 122, herein shown as a bulb-shaped grip. Other tool configurations may be used as well, this tool being merely illustrative.

SUMMARY OF FOLDING OPERATIONS AND ADJUSTMENT

The manner of operation of the various folding mechanisms will be apparent from the foregoing description and the following summary of those operations, with particular reference to FIGS. 4a through 4e. Beginning with the bicycle 10 unfolded as shown in FIG. 4a (and FIG. 1), the handlebar assembly 21 is released for folding into the lowered, front-to-rear position in FIG. 4b and 4c by unscrewing the vertical fastener bolt 80 in the coupler 78 from its socket 82 (FIG. 11) using the tool 120 in the hexagonal socket in the head 83 of the bolt. Then the handlebar 57 is simply lowered into the folded position.

For the next step, the bolts 44 of the folding joints 38 and 39 are unscrewed from their sockets 54 and the frame 11 is folded about the hinge axis 40. With the hinge axis centered between the two wheel mounts 20 and 25, this brings the front and rear wheels 12 and 13 into side-by-side relation, as shown in FIGS. 4d and 4e. The handlebar 57 is conveniently positioned alongside the two frame sections, and one pedal 33 on the right side of the unfolded frame now projects into the folded assembly. The other pedal 33 may be folded upward, as shown in FIG. 4e, and the folding is completed.

Figure 6A:
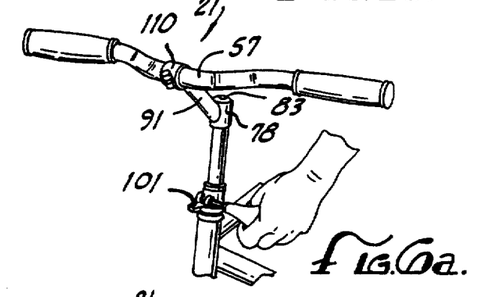
FIGS. 6a through 6c are fragmentary diagrammatic perspective views showing the manner of use of the tool of FIGS. 5a and 5b in operating the upward and forward handlebar extensions and the upward seat extension.
Figure 6B:
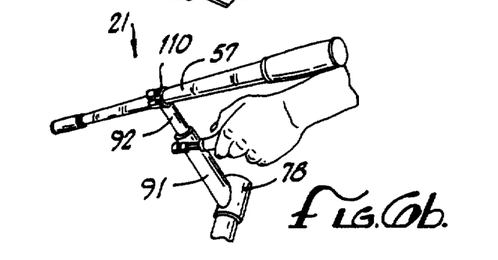
Figure 6C:
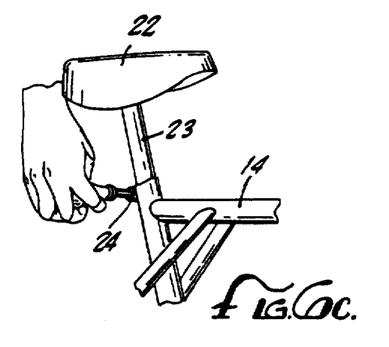

Shown in FIGS. 6a through 6c are three height adjustments for the bicycle. FIGS. 6a and 6b show the telescoping adjustments permitted by the two extension joints above and below the handlebar hinge coupler 78, controlled by the clamps 101 and 110, the adjustment in FIG. 6b being both upward and forward. FIG. 6c shows the adjustment of the clamp 24 controlling the telescoping of the seat stem 23. The tool 120 may be used for all three of these clamps.

Unfolding of the bicycle 10 is accomplished by reversing the sequence of operations shown in FIGS. 4a through 4e. With a small amount of practice, both folding and unfolding become very quick and easy operations. Equally important, the bicycle is held very securely in the normal operating condition when it is unfolded and the folding hinges 38 and 39 of the frame and 55 of the handlebar assembly are secured by their respective fasteners.

From the foregoing, it should be apparent that the present invention provides a foldable bicycle in which the folding mechanisms are inconspicuous but highly effective. It also will be apparent that, while a particular embodiment has been illustrated and described in detail, various modifications and changes may be made by those skilled in the art, within the spirit and scope of the following claims.

We claim as our invention:

1. In a foldable bicycle having a frame including a top tube and a down tube, both of circular cross-sectioned shape, with front and rear ends, a front wheel fork having an upper end rotatably mounted on the front end of the frame, and a handlebar assembly having a lower end joined to the upper end of the fork, the improvement comprising:

two folding joints interposed in gaps in said top tube and said bottom tube lying along a hinge axis that is approximately midway between the front and rear ends of the frame and substantially vertical in the normal operating position of the bicycle, each of said tubes having opposed open ends facing toward the associated gap, and each of said folding joints comprising:

two hinge mounts in the form of disks substantially flush with the adjacent tube and carried by a plug of reduced diameter fitted snugly inside the tube and secured thereto, two side-by-side hinge leaves disposed on opposite sides of a generally horizontal parting plane and extending from said hinge mounts partially across the gap longitudinally of the frame, each leaf having a thickened generally semi-cylindrical center section substantially flush with the disk and two ears projecting laterally in opposite directions from the center section to lie alongside the ears of the other leaf, one of said center sections having a first passage therethrough with an enlarged recess at its outer end, and the other of the center sections having an aligned internally threaded second passage, means pivotally connecting two of said ears on one side of said hinge axis for swinging about the hinge axis to fold the frame about the hinge axis, and permitting limited separation of said leaves longitudinally of the hinge axis, opposed, interlocking surfaces on the adjacent sides of the other two of said ears on the other side of said hinge axis preventing relative pivoting movement of said leaves when said surfaces are pressed together, and a fastener bolt having a head disposed in said enlarged recess and a threaded stem extending through said first passage and threaded into said second passage to clamp said leaves releasably together, thereby securing the frame in the normal operating condition but permitting folding of the frame about said hinge axis;

said handlebar assembly including a handlebar, an upper adjustment joint comprising two elongated upper telescoping members supporting the handlebar and inclined downwardly and rearwardly from the handlebar, a lower adjustment joint comprising two elongated telescoping lower supporting members joined to said front wheel fork and extending upwardly therefrom, each of said adjustment joints including means for securing the telescoping members releasably in a selected telescoped position, folding joint means pivotally connecting said upper adjustment joint to said lower adjustment joint for folding from an upright operating position in which the handlebar extends transversely on the frame to a lowered folded position in which the handlebar is disposed in a front-to-rear position alongside the frame, and coupling means between the lower end of said upper adjustment joint and the upper end of said lower adjustment joint for securing the handlebar assembly releasably in the upright operating position.

2. The improvement defined in claim i wherein said fastener bolt has a non-circular socket in its head for receiving a non-circular driving tool.

3. The improvement defined in claim wherein said opposed interlocking surfaces comprise interfitting ribs and grooves extending generally radially relative to the hinge axis.

4. The improvement defined in claim 1 wherein said top tube is generally horizontal in the normal operating position of the bicycle and said down tube is inclined downwardly and rearwardly, and said parting plane in each joint is substantially horizontal.

5. The improvement defined in claim wherein said coupling means for said handlebar assembly comprise an upward extension of said upper end of said lower adjustment joint secured to the lower end of said upper adjustment joint and releasably engaged with said upper end, and a fastener extending downwardly through said extension and releasably coupled to said upper end.

6. The improvement defined in claim 1 wherein said coupling means for said handlebar assembly comprise a cup-shaped base for said upper adjustment joint having a closed upper end with a passage therethrough and an open lower end fitted against the upper end of said lower adjustment joint, and a bolt having a head abutting against said closed upper end and a stem extending downwardly to the upper end of said lower adjustment joint, the latter having a threaded hole therein for receiving the bolt to clamp said base against said upper end.

7. The improvement defined in claim 6 wherein said upper end of said lower adjustment joint has an upwardly tapered surface surrounded by an annular rim, and the open lower end of said base has a complimentarily shaped surface clamped tightly against said surface by the bolt.

8. The improvement defined in claim 6 wherein said upper end of said base has a recess around the passage therein, and said bolt head is substantially recessed therein.

9. The improvement defined in claim 8 wherein said bolt head has a non-circular socket therein for engagement with a non-circular driving tool.

10. In a foldable bicycle having a frame including a top tube and a down tube, both of circular cross-sectioned shape, with front and rear ends, a front wheel fork having an upper end rotatably mounted on the front end of the frame, and a handlebar assembly having a lower end joined to the upper end of the fork, the improvement comprising:
two folding joints interposed in gaps in said top tube and said bottom tube lying along a hinge axis that is approximately midway between the front and rear ends of the frame and substantially vertical in the normal operating position of the bicycle, each of said tubes having opposed open ends facing toward the associated gap, and each of said folding joints comprising:
two hinge mounts in the form of disks substantially flush with the adjacent tube and carried by a plug of reduced diameter fitted snugly inside the tube and secured thereto,
two side-by-side hinge leaves disposed on opposite sides of a generally horizontal parting plane and extending from said hinge mounts partially across the gap longitudinally of the frame, each leaf having a thickened generally semi-cylindrical center section substantially flush with the disk and two ears projecting laterally in opposite directions from the center section to lie alongside the ears of the other leaf, one of said center sections having a first passage therethrough with an enlarged recess at its outer end, and the other of the center sections having an aligned internally threaded second passage,
means pivotally connecting two of said ears on one side of said hinge axis for swinging about the hinge axis to fold the frame about the hinge axis, and permitting limited separation of said leaves longitudinally of the hinge axis,
opposed, interlocking surfaces on the adjacent sides of the other two of said ears on the other side of said hinge axis preventing relative pivoting movement of said leaves when said surfaces are pressed together,
and a fastener bolt having a head disposed in said enlarged recess and a threaded stem extending through said first passage and threaded into said second passage to clamp said leaves releasably together, thereby securing the frame in the normal operating condition but permitting folding of the frame about said hinge axis.

11. The improvement defined in claim 10 wherein said fastener bolt has a non-circular socket in its head for receiving a non-circular driving tool.

12. The improvement defined in claim 10 wherein said opposed interlocking surfaces comprise interfitting ribs and grooves extending generally radially relative to the hinge axis.

13. The improvement defined in claim 10 wherein said top tube is generally horizontal in the normal operating position of the bicycle and said down tube is inclined downwardly and rearwardly, and said parting plane in each joint is substantially horizontal.

14. The improvement defined in claim 10 wherein said coupling means for said handlebar assembly comprise an upward extension of said upper end of said lower adjustment joint secured to the lower end of said upper adjustment joint and releasably engaged with said upper end, and a fastener extending downwardly through said extension and releasably coupled to said upper end.

15. In a foldable bicycle having a frame including a top tube and a down tube, front and rear ends, a rear wheel mount on the rear end of said frame and a front wheel mount on the front end of said frame, a fork rotatably mounted on said front wheel mount and having a lower end to support a front wheel, and a handlebar having a stem rotatably mounted on said front wheel mount and joined to said fork for steering of the bicycle, the improvements comprising:
two folding joints interposed in said top tube and said bottom tube on a hinge axis approximately midway between said lower end of said fork and said rear end of said frame, said tubes being interrupted at said hinge axis to form a gap in each tube and divide the frame into front and rear sections, each of said folding joints comprising,
two hinge mounts secured to the ends of the tube on opposite sides of the hinge axis, said hinge mounts including plugs extending into said tubes on opposite sides of said gaps and being substantially flush with the tubes,
a hinge leaf secured to each hinge mount and extending across the gap toward the other hinge mount, said leaves being disposed on opposite sides of the longitudinal axis of the tube and having opposed surfaces disposed in side-by-side relation, means for pivotally connecting said leaves together on one lateral side of said longitudinal axis for swinging of the front ends of said tubes around said hinge axis into rearwardly extending folded positions alongside said rear section, the opposed surfaces of said hinge leaves having opposed clamping faces spaced laterally from said hinge axis along said surface, and having interlocking means thereon for preventing relative sliding of said faces about said hinge axis when the clamping faces are clamped together, and selectively operable means for clamping said surfaces tightly together when the frame is to be held in the unfolded condition and for releasing the surfaces for separation of said clamping faces when the frame is to be folded, said means for clamping comprising connectors extending through said leaves parallel to said hinge and each having a recessed head in one of said leaves and an opposite end threaded into the other of said leaves.

16. The improvement defined in claim 15 wherein said hinge leaves are positioned on said tubes to disposed said surfaces substantially in horizontal planes with the hinge axis substantially vertical when the bicycle is upright.

17. The improvement defined in claim 15 wherein said one leaf has an enlarged recess for receiving said head, with a shoulder at the bottom of the recess for clamping engagement with the head, whereby the head is received in a non-protruding position in the joint.

18. The improvement defined in claim 17 wherein said head has a non-circular socket for receiving a driving tool.

19. The improvement defined in claim 15 wherein said clamping surfaces are formed with interlocking sets of ribs and grooves extending transversely of said tubes to prevent relative pivoting movement of said leaves when the leaves are clamped together.

20. For use in a foldable bicycle having a frame with at least one elongated frame member formed by two sections in end-to-end relation and spaced apart to form a gap in the frame member, an improved folding joint comprising:

first and second hinge mounts to be secured, respectively, to the frame member sections;

first and second hinge leaves secured, respectively, to said first and second hinge mounts and disposed in side-by-side relation in said gap on opposite sides of a parting plane extending longitudinally of the frame member, said hinge leaves having opposed surfaces generally on opposite sides of said parting plane extending longitudinally of the frame member, said hinge leaves having opposed surfaces generally on opposite sides of said parting plane and having generally semi-cylindrical central portions for fitting substantially flushly between frame member sections of circular cross-section and ear projecting laterally from the central portion on each side;

means pivotally connecting said hinge leaves together to swing relative to each other about a hinge axis substantially normal to said parting plane to swing one of the sections about said hinge axis into side-by-side relation with the other section comprising a hinge pin rotatably joining the two ears on one side of the fastener;

selectively operable means for clamping said hinge leaves tightly together and releasing the leaves for movement away from each other comprising a fastener having a head recessed into the central portion of one leaf and a stem threaded into the central portion of the other leaf;

and means on said hinge leaves for preventing pivoting of the leaves relative to each other about said hinge axis when the leaves are clamped together thereby to hold the frame member securely in the extended position when the leaves are clamped together, comprising opposed, interlocking ribs on the adjacent surfaces of said leaves between the two ears on the other side of the fastener, said hinge pin permitting movement of said leaves away from each other to disengage said ribs for folding of the bicycle.

21. An improved folding joint as defined in claim 20 wherein said hinge mounts comprise disks for abutting against the ends of the sections, and plugs on said disks for fitting tightly inside such sections.

22. An improved folding joint as defined in claim 20 wherein said hinge axis is positioned on said leaves to lie along one side of the frame member, and said clamping means is positioned on said leaves to be centrally located on the frame member.

23. An improved folding joint as defined in claim 22 wherein said means on said hinge leaves for preventing pivoting comprise opposed ribs on said opposed surfaces that are engaged when the leaves are clamped together.

24. An improved folding joint as defined in claim 23 wherein said ribs are formed on portions of said leaves spaced radially from said hinge axis, and are positioned to extend transversely of the frame member.

25. An improved folding joint as defined in claim 23 wherein said ribs are on portions of said leaves positioned to lie along the side of the frame member opposite said hinge axis, said clamping means being disposed between said ribs and said hinge axis.

26. An improved folding joint as defined in claim 20 wherein said selectively operable means for clamping said hinge leaves comprise a bolt having a threaded stem extending through one of said hinge leaves toward the other hinge leaf, and a threaded hole in the other leaf receiving said stem, said bolt having a head for abutting against said one leaf and clamping the leaves together.

27. An improved folding joint as defined in claim 26 wherein said one leaf is formed with a recess for receiving said bolt head in a non-protruding position.

28. An improved folding joint as defined in claim 26 wherein said bolt head has a non-circular recess for receiving a non-circular driving tool.

29. An improved folding joint as defined in claim 20 wherein said means pivotally connecting said hinge leaves together comprise a rivet extending through first and second aligned holes in said first and second leaves, respectively, and heads on the opposite ends of said rivet, said heads being spaced apart to permit limited separation of said leaves.

30. In a foldable bicycle having a frame including a front end, a front wheel fork having an upper end rotatably mounted on said front end, and a handlebar assembly including a handlebar and having a lower end joined to the upper end of the fork, the improvement comprising:

an upper adjustment joint comprising two elongated upper telescoping members supporting the handlebar and inclined downwardly and rearwardly from the handlebar, a lower adjustment joint comprising two elongated telescoping lower supporting members joined to said front wheel fork and extending upwardly therefrom, each of said adjustment joints including means for securing the telescoping members releasably in a selected telescoped position, folding joint means pivotally connecting said upper adjustment joint to said lower adjustment joint for folding from an upright operating position in which the handlebar extends transversely on the frame to a lowered folded position in which the handlebar is disposed in a front-to-rear position alongside the frame, and coupling means between the lower end of said upper adjustment joint and the upper end of said lower adjustment joint for securing the handlebar assembly releasably in the upright operating position, comprising an upward extension of said upper end of said lower adjustment joint secured to the lower end of said upper adjustment joint and releasably engaged with said upper end, and a fastener extending downwardly through said extension and releasably coupled to said upper end.

31. The improvement defined in claim 30 wherein said coupling means for said handlebar assembly comprises a cup-shaped base for said upper adjustment joint having a closed upper end with a passage therethrough and an open lower end fitted against the upper end of said lower adjustment joint, and a bolt having a head abutting against said closed upper end and a stem extending downwardly to the upper end of said lower adjustment joint, the latter having a threaded hole therein for receiving the bolt to clamp said base against said upper end.

32. The improvement defined in claim 31 wherein said upper end of said lower adjustment joint has an upwardly tapered surface surrounded by an annular rim, and the open lower end of said base has a complimentarily shaped surface clamped tightly against said surface by the bolt.

33. The improvement defined in claim 31 wherein said upper end of said base has a recess a the passage therein, and said bolt head is substantially recessed therein.

34. The improvement defined in claim 33 wherein said bolt head has a non-circular socket therein for engagement with a non-circular driving tool.

35. For use in a foldable bicycle having a frame with a front end, and a front wheel assembly having an upper element rotatably mounted on said front end, a foldable handlebar assembly, comprising:

a handlebar adapted to be disposed in a normal operating position extending transversely of the frame generally above the front end thereof;

an upper handlebar supporting section secured to the central portion of the handlebar and extending downwardly and rearwardly therefrom;

a coupler base for said upper section secured to the lower end thereof;

a lower handlebar supporting section adapted to be secured to the upper element of the front wheel assembly, said lower section having an upper end disposed against said base;

folding joint means connected between said base and said lower handlebar supporting section and supporting said upper handlebar section for folding about a hinge axis alongside said base into a folded position alongside the frame;

and coupling means for releasably securing said base to said lower handlebar section including a bolt having an upper end formed with a head adjacent the upper end of said base, a stem extending downwardly through the base and a lower end threaded onto and releasably engageable with the upper end of said lower supporting section and normally holding said base tightly against said lower supporting section.

36. A foldable handlebar assembly as defined in claim 35 wherein said fastener is a bolt having a head substantially recessed into said upper end of said base and a stem extending downwardly through the base and threaded into the upper end of said lower supporting section.

37. A foldable handlebar assembly as defined in claim 35 wherein said head has a non-circular socket for engagement with a non-circular driving tool.

38. A foldable handlebar assembly as defined in claim 35 wherein said coupler base is cup-shaped and has an open lower end engageable with said lower supporting section, the latter having an upwardly tapering surface engageable with said base with a tight fit.

39. A foldable handlebar assembly as defined in claim 35 wherein said upper handlebar supporting section comprises two telescoping support members for adjusting the position of the handlebar upwardly and forwardly, and means for clamping the support members in a selected adjusted position.

40. A foldable handlebar assembly as defined in claim 39 wherein said lower supporting section includes two telescoping support members for adjusting the position of the handlebar generally vertically, and means for clamping the support members in a selected adjusted position.

41. A foldable handlebar assembly as defined in claim 40 wherein one of the telescoping members of the lower supporting section is an upward extension of the upper element of the front wheel assembly.

42. A foldable handlebar assembly as defined in claim 40 wherein both of said means for clamping the support members and said fastener have recessed heads formed with the same non-circular socket for engagement with a non-circular driving tool.

* * * * *

UNITED STATES PATENT AND TRADEMARK OFFICE
CERTIFICATE OF CORRECTION

PATENT NO. : 5,269,550
DATED : Dec. 14, 1993
INVENTOR(S) : David T. Hon, Chuan Liao and Guo M. Cheng It is certified that error appears in the above-indentified patent and that said Letters Patent is hereby corrected as shown below:

Column 8, line 49, after the word "FIGS." and before "and" insert -- 1 --.

In the Claims,

Column 11, claim 2, line 1, after the word "claim" and before "wherein" delete "i" and insert --1--; claim 3, line 1, after the word "claim" and before "wherein" insert -- 1 --; claim 5, line 1, after the word "claim" and before "wherein" insert -- 1 --.

Column 15, claim 33, line 2, after the word "recess" and before "the" delete "a" and insert -- around --.

Column 16, claim 36, lines 1 through 6, delete claim 36.

Signed and Sealed this

First Day of October, 1996

Attest:

BRUCE LEHMAN

*Attesting Officer*  *Commissioner of Patents and Trademarks*